Sept. 25, 1923.

G. T. MORRIS

VENTILATING COVER FOR CONTAINERS

Filed April 18, 1922

WITNESSES

INVENTOR
George T. Morris
BY
ATTORNEYS

Patented Sept. 25, 1923.

1,469,169

UNITED STATES PATENT OFFICE.

GEORGE T. MORRIS, OF MISSOULA, MONTANA, ASSIGNOR OF ONE-THIRD TO FRED MADSEN AND ONE-THIRD TO HARRY L. SHAPARD, BOTH OF MISSOULA, MONTANA.

VENTILATING COVER FOR CONTAINERS.

Application filed April 18, 1922. Serial No. 555,137.

*To all whom it may concern:*

Be it known that I, GEORGE T. MORRIS, a citizen of the United States, and a resident of Missoula, county of Missoula, and State of Montana, have invented new and Improved Ventilating Covers for Containers, of which the following is a full, clear, and exact description.

The present invention relates to new and useful improvements in containers and it pertains more particularly to containers employed for transporting milk, cream, and the like.

It is one of the primary objects of the invention to provide a container of the above-mentioned type in which the interior of the container will be at all times in communication with the exterior thereof to afford proper ventilation of the contents within the container.

It is a well-known fact that cream, milk, and the like, generate gases which have a deleterious effect upon the cream or milk if confined therewith, and it is a further object of the invention to so construct a cover for milk containers that the gases generated within the container may be discharged therefrom.

With the above and other objects in view, reference is had to the accompanying drawings, in which—

Figure 1:
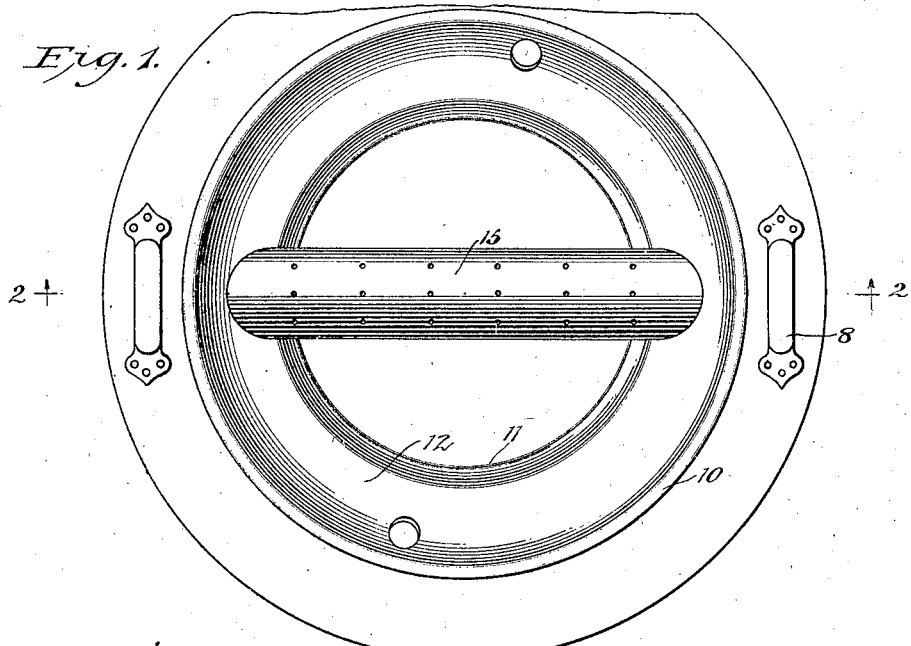
Figure 1 is a top plan view of a milk container equipped with a cover constructed in accordance with the present invention, a portion of the container being broken away in said Figure.
Figure 2:
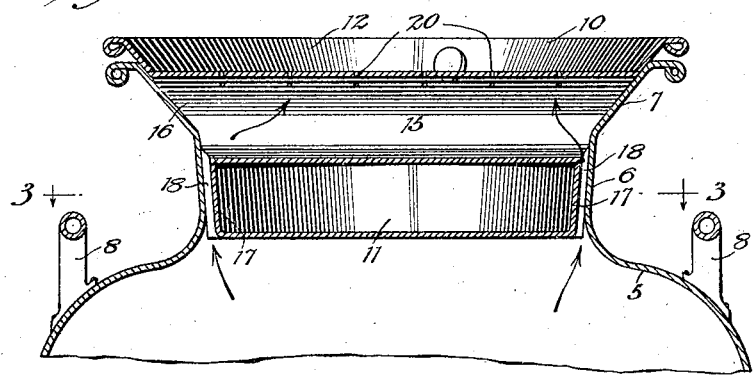
Fig. 2 is a vertical sectional view taken on the line 2—2 of Fig. 1.
Figure 3:
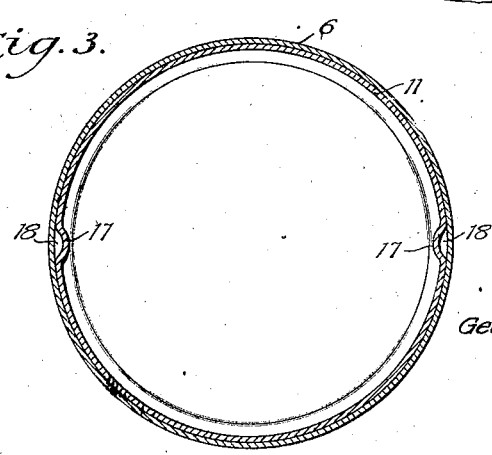
Fig. 3 is a horizontal sectional view taken on the line 3—3 of Fig. 2.

Referring more particularly to the drawings, the reference character 5 designates the container and said container is provided with a contracted neck portion 6 and a flared portion 7, as is common in milk can construction. Handles 8 are secured to the container at the desired position.

The reference character 10 designates the cover for the container and said cover is formed with a tapered cylindrical portion 11 and a flared portion 12, the cylindrical portion 11 being adapted to frictionally engage the contracted portion 6 of the container, and the flared portion 12 of the cover being adapted to engage the flared portion 7 of the container. Extending diametrically of the cover 10 is a tubular member 15, and said tubular member has its ends open as indicated by the reference character 16. The lower wall of this tubular portion 15 extends to a point slightly below the base of the flared portion 12 of the cover 10, and the said walls of the tapered portion 11 of the cover 10 are bent inwardly at diametrically opposite points as indicated by the reference character 17 to provide passages or channels 18. The tubular member 15 is provided in its upper portion with a plurality of perforations 20, or the like, which pass through the wall of the tubular member 15 to the interior thereof.

By this construction it is apparent that with the cover 10 in position, gases generated within the container 5 are permitted to escape by way of the passages 18, the tubular member 15, and the perforations 20. Furthermore, the invention provides means for permitting of the escape of gases, and, at the same time, prevents a spilling of the contents of the container during transportation.

Various slight changes might be made in the general form and arrangement of the parts described without departing from the spirit of the invention, and hence I do not limit myself to the precise details set forth but consider myself at liberty to make such changes and alterations as fairly fall within the spirit of the invention and the scope of the appended claims.

What is claimed is:

1. A cover for milk containers and the like, comprising a tapered hollow portion terminating in an annular flange, said tapered hollow portion being crimped at diametrically opposite points to provide channels or passages, and an open ended and perforated tubular member extending diametrically across said cover with its open ends in alignment with the diametrically opposed crimped portions and communicating therewith.

2. In a cover for containers, a diametrically and horizontally disposed perforated tubular member, said perforations being in the upper portion thereof, and a plurality of air passages formed by crimping the cover at the ends of the perforated tubular member and serving to establish communication between the tubular member and the interior of the container to provide for ventilation of the interior of the container.

GEORGE T. MORRIS.